United States Patent Office 3,232,994
Patented Feb. 1, 1966

3,232,994
NOVEL BISPHENOLS AND PREPARATION THEREOF USING ION EXCHANGE RESINS
Francis N. Apel, Nutley, and Louis B. Conte, Jr., Newark, N.J., assignors to Union Carbide Corporation, a corporation of New York
No Drawing. Filed Dec. 27, 1962, Ser. No. 247,537
11 Claims. (Cl. 260—619)

This application is a continuation-in-part of our copending application, Serial No. 72,585, filed November 30, 1960, and now abandoned.

This invention relates to novel bisphenols and method of preparing the same using ion exchange resins.

Heretofore it has been known to condense phenols with aldehydes and ketones to produce bisphenols. The bisphenols thus produced have their phenolic portions on a single carbon atom. The close proximity of the phenolic portions has limited the control which can be exercised over the properties of these known bisphenols. Methods have been proposed to put the phenolic portions on different carbon atoms as by a double Fries rearrangement of the phenolic esters of dibasic acids, but such processes have not been practically useful.

It is an object, therefore, of the present invention to provide bsiphenols wherein the phenolic portions are attached to different carbon atoms.

It is another object to provide a practical method for producing bisphenols whose phenolic portions are on different carbon atoms.

It is another object to provide novel bisphenols.

We have now discovered that bisphenols having phenolic portions on different carbon atoms are prepared by contacting together vinyl cyclohexene and at least a stoichiometric amount of a phenol with an acidic cation exchanging resin.

The reaction shown for phenol and vinyl cyclohexene proceeds, in general, as follows:

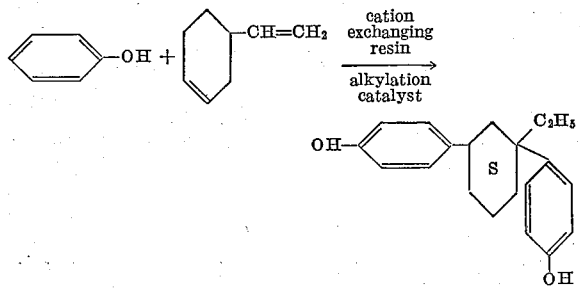

This compound is 1,3-bis(p-hydroxyphenyl)-1-ethyl cyclohexane, the bisphenol of vinyl cyclohexene, and is a new compound.

A substantial molar excess of phenol over vinyl cyclohexene is desirable. Thus molar ratios of from 3 to 20 and more moles of the phenol per mole of vinyl cyclohexene are completely suitable. Molar ratios of from 6 to 12 moles of phenol per mole of vinyl cyclohexene provide good reaction rates and are easily handled and, hence, are preferred. Molar ratios of about 10 to 1 of phenol per mole of vinyl cyclohexene provide optimum rates with the catalyst of this invention and, hence, are particularly preferred.

The reaction can be carried out at atmospheric, subatmospheric or superatmospheric pressure and at temperatures ranging from above 30° C. to about 150° C. Reaction temperatures above about 50° C. to insure good viscosity in the reaction mixture and below about 125° C. to permit reaction without use of elaborate pressure equipment are preferred. Particularly preferred is reaction under atmospheric pressure at temperatures from 70° C. to 100° C.

Vinyl cyclohexene as used herein refers to 4-vinyl cyclohexene, a water white liquid having a boiling point of about 127–129° C. which is commercially available or may be obtained by the dimerization of butadiene.

Phenols which can be alkylated with vinyl cyclohexene to form the bisphenols of vinyl cyclohexene of this invention are hydroxy substituted aryl compounds having a replaceable hydrogen attached to a ring carbon atom in a position other than meta, i.e., either ortho or para to a phenolic hydroxyl. Thus the term "phenol" includes mono-nuclear, substituted and unsubstituted hydroxyaryl compounds. A "replaceable hydrogen" as the term is used in the present specification and claims is (1) a hydrogen which is attached to a carbon atom which is not impeded from reacting with vinyl cyclohexene by the spatial arrangement of nearby atoms forming a part of the same molecule, i.e., is sterically unhindered and (2) is electronically unhindered, i.e., is not limited in activity by the presence, in other positions on the phenolic ring, of substitutents tending to attract the ortho and para hydrogen more strongly to the phenolic ring, e.g., nitro groups. Among the phenols having replaceable hydrogens in the positions ortho and para to a phenolic hydroxyl, some of those deserving of special mention are: hydroxy substituted benzenes, e.g., phenol, catechol, pyrogallol, resorcinol, phloroglucinol, and unsymmetrical trihydroxy substituted benzenes; substituted phenols having in the meta positions, ortho positions or para position, providing at least one of the ortho positions or the para position is unsubstituted, one or more ortho or para directing substituents such as alkyl groups, aryl groups, alkaryl groups, halogen groups, i.e., fluorine, chlorine, bromine and iodine, alkoxy groups and aryloxy groups. Preferred as substituents in the above compounds are straight and branched chain alkyl and aralkyl groups having from 1 to 10 carbon atoms, particularly lower alkyl substituents, i.e., having from 1 to 6 carbon atoms. Among the substituted phenols those deserving of special mention are the cresols, xylenols, guiacol, 4-ethylresorcinol, 5-methylresorcinol, 4-propylresorcinol, carvacrol, methylphenol, ethylphenol, butylphenol, octylphenol, dodecylphenol, eicosylphenol, triacontylphenol, and tetracontylphenol, 2,3-dimethylphenol, 2,4-dimethylphenol, 2-ethyl-4-propylphenol, 2,5-dimethylphenol, 2-ethyl-4-methylphenol, 2,4-diethylphenol, 2-methyl-4-butylphenol, 2-ethyl-5-methylphenol, 2-methyl-5-isopropylphenol, 2-propyl-5-methylphenol, 2-isopropyl-5-methylphenol, 2,6-dimethylphenol, 2-methyl-6-ethylphenol, 2,6-diethylphenol 2-methyl-6-propylphenol, 3,4-dimethylphenol, 3-methyl-4-ethylphenol, 3,5-dimethylphenol, 3,5-diethylphenol, 2-chloro-4-methylphenol, 2-ethyl-4-chlorophenol, 3-chloro-4-methylphenol, 2,3,4-trimethylphenol, 2,3,5-trimethylphenol, 2,4-dimethyl-5-ethylphenol, 2-ethyl-4,5-dimethylphenol, 2,4-diethyl - 5 - methylphenol, 3,4,5-trimethylphenol and higher alkyl phenols.

Thus the term "bisphenol of vinyl cyclohexene" is used herein to refer to 1,3-bis(p-hydroxyphenyl)-1-ethyl-cyclohexanes. And the term "bisphenols of vinyl cyclohexene" as used herein includes compounds having the formula

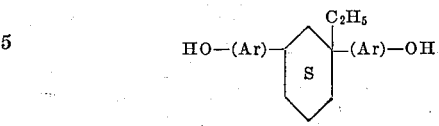

wherein Ar represents an aromatic moiety, such as phenyl or naphthyl and which may contain up to three substituent groups thereon as for example hydroxyl, halogen, hydrocarbon or oxyhydrocarbon substituents on a phenolic ring carbon atom, e.g., selected from alkyl, aryl, alkaryl, aralkyl, alkoxy, hydroxyl or fluorine, chlorine, bromine, or iodine groups, and which is free of aliphatic unsaturation, and similar inert groups. Hence the term "phenyl" herein includes substituted phenyl radicals. The point of attachment of the above phenolic portions can be ortho or para to a phenolic hydroxyl.

The alkylation catalyst used in the reaction of the above phenols with vinyl cyclohexene in the present invention comprises the hydrogen form ($H^+$) of a cation exchanging resin, i.e., an "acidic" cation exchanging resin. These resins are insoluble in the reaction mixture and hence there is no problem of catalyst separation from the reaction zone effluent or need of removal of small amounts of impurities in the product. Throughout the reaction and product recovery the catalyst remains in the reaction zone. The service life of the acidic cation exchanging resin in this method is nearly infinite and hence the resin does not of necessity have to be regenerated, if care is exercised in preventing the introduction of basic metal ions such as potassium, calcium, etc. or other contaminants which inactivate the cation exchanging groups of the resin. The use of this insoluble catalyst confers the additional advantages of (1) eliminating the need for acid corrosion resistant equipment which is otherwise essential and (2) making unnecessary any neutralization steps.

The cation exchanging resins are substantially insoluble polymeric skeletons with strongly acidic cation exchanging groups chemically bound thereto. The exchange potential of the bound acidic groups and the number of them which are available for contact with the phenol and vinyl cyclohexene reaction mixture determine the alkylating effectiveness of a particular cation exchanging resin. Thus, although the number of acidic groups bound to the polymeric skeleton of the resin determines the theoretical "exchange capacity" thereof, a more accurate criterion of catalytic effectiveness is the number of acidic groups available for contact with the reactants. This contact can occur on the surface or in the interior of the cation exchanging resin; therefore, a form of resin which provides a maximum amount of surface area for contact and diffusion, e.g., porous microspheres or beads, is highly desirable and affords the highest rate of reaction and reaction economy in this process. The particular form of the cation exchanging resin used, however, is not critical.

The cation exchanging resins should be substantially insoluble in the reaction mixture and in any solvent to which the resin may be exposed in service. Resin insolubility is generally attributable to cross-linking within the resin but can be caused by other factors, e.g., high molecular weight or a high degree of crystallinity.

In general, the greater the exchange capacity of a resin, i.e., the greater the number of milliequivalents of solid per gram of dry resin, the more desirable is the resin. Resins having an exchange capacity greater than about two milliequivalents of acid per gram of dry resin are preferred. Particularly preferred are resins with bound cation exchanging groups of the stronger exchange potential acids. Results obtained with cation exchanging resins having bound sulfonic acid groups have been highly satisfactory. Among the cation exchanging resins which are highly deserving of special mention are: sulfonated styrene-divinylbenzene copolymers, sulfonated cross-linked styrene polymers, phenol formaldehyde sulfonic acid resins, benzene-formaldehyde-sulfonic acid resins, and the like. Most of these resins and many others are available commercially under trade names such as: Amberlite XE-100 and Amberlyst-15 (Rohm and Haas Co.); Dowex 50-X-4 (Dow Chemical Co.); Permutit QH (Permutit Co.); and Chempro C-20 (Chemical Process Co.).

Many cation exchanging resins are received from the manufacturer in the form of the sodium or other salt and must be converted to the hydrogen or acid form prior to use in this process. The conversion can be easily accomplished by washing the resin with a solution of a suitable mineral acid, e.g., sulfuric, hydrofluoric or hydrochloric acids. For example, a sulfonated resin can be suitably washed with a sulfuric acid solution. Salts formed during the conversation procedure are conveniently removed by washing the resin with water or solvent for the salt. In this process the wash acid is of no significance as a catalyst but only serves to put the cation exchanging resin in a suitable form.

It frequently happens as a result of either the washing operation outlined above, or the manufacturer's method of shipping, that the resin will contain from 50 percent to 100 percent of its own weight of water. All but about 2% of this water as a maximum is preferably removed prior to the use of the cation exchanging resin. Suitable methods for removing the water in the resin include drying the resin under reduced pressure in an oven; soaking the resin in melted anhydrous phenol for a time sufficient to fill the resin interspaces with phenol; and azeotropic distillation of water and phenol in the presence of an excess of phenol.

The resin when once conditioned in this manner to insure substantially anhydrous conditions, i.e., <2% water throughout does not require conditioning at any time during use. Alternatively, the resin can be conditioned after installation in the process equipment merely by running the reaction mixture through the resin until sufficient water is removed. In this latter procedure dehydration is accomplished by the phenol.

The amount of cation exchanging resin used can be varied over a wide range with commensurate rates of reaction. Concentrations of catalyst ranging from about 0.1 to about 5 acid equivalents per mole of vinyl cyclohexene are preferred. Lower concentrations provide less rapid reaction rates. Cation exchanging resin concentrations ranging from about three-tenths of an acid equivalent to about four acid equivalents per mole of vinyl cyclohexene have given excellent results and are particularly preferred.

A concentration of about one acid equivalent per mole of vinyl cyclohexene provides the optimum combination of reaction rate yield and product quality and is the most desirable concentration when operating at temperatures between about 70° C. and 75° C. with a 10:1 ratio of phenol to vinyl cyclohexene.

The following example is illustrative of the practice of the present invention. All parts and percentages are by weight unless otherwise stated.

*Example 1*

The equipment used was a round bottom 3-neck flask fitted with a stirrer, thermometer, reflux condenser and a dropping funnel. To the flask was added 940 grams (10 moles) of freshly distilled phenol and 250 grams (about 1 acid equivalent) of a sulfonated styrene 4% divinylbenzene copolymer cation exchanging resin prepared as above described by replacing with phenol substantially all the water therefrom, i.e., to less than 2%.

The catalyst-phenol mixture was heated to 70–75° C. and 108 grams (1 mole) of vinyl cyclohexene was added dropwise over a 30 minute period. Cooling during this period maintained the temperature of the reactants at between 70 and 75° C. After the addition and when the exotherm had subsided, heat was applied for an additional 5 hours to maintain a temperature between 70 and 75° C.

After this period, the warm reaction mixture was filtered and the catalyst was washed with 250 grams of molten phenol. The combined filtrate and washings were distilled at a reduced pressure to a final residue temperature of 200° C. of about 1 mm. Hg pressure.

The light amber colored crude residue of bisphenol of vinyl cyclohexene weighed 193 grams for a yield of 70% calculated as the bisphenol and based on the vinyl cyclohexene.

This crude residue was crystallized from an equal weight of hot toluene and produced 100 grams of fine, white crystals having an uncorrected melting point of 183°–184° C. The percent hydroxyl determined for the crystalline produce was 11.50±0.03%; the theoretical calculated for the bisphenol of vinyl cyclohexene is 11.48%.

The product of the above example was proved to be 1,3-bis(p-hydroxyphenyl)-1-ethylcyclohexane by a comparison of the elemental analysis, and infrared and nuclear magnetic resonance spectra of a hydrocarbon, 1,3-diphenyl-1-ethylcyclohexane prepared from this product by selectively removing its phenolic hydroxyl groups under mild conditions by reductive cleavage of a phosphate ester of the phenol as described by D. W. Kenner and N. R. Williams, J. Chem. Soc., 1955, 522. Known 1,3-diphenyl-1-ethylcyclohexane was synthesized as follows:

3,5 - diphenyl - 6 - carboethoxycyclohexene - 2 - one - 1 (A) was prepared via an aldol condensation of ethyl acetoacetate with benzalacetopheone catalyzed by sodium ethoxide. The melting point of (A) agreed with that given by E. Knoevenagel, E. Speyer, Ber., 35 (1902). Hydrolytic decarboxylation of (A) to yield 3,5-diphenylcyclohexene-2-one-1 (B) was effected using aqueous sodium hydroxide at reflux. The melting point of (B) agreed with that given by E. Knoevenagel, A. Erler, Ber., 36, 2133 (1903) and W. Dieckmann, K. V. Fischer, Ber., 44, 971 (1911). The compound (B) was reacted with ethyl magnesium bromide to produce 3,5-diphenyl-3-ethylcyclohexanone (C). The structure of (C) was confirmed by elemental, infrared and nuclear magnetic resonance analysis. By a Wolff-Kisher reduction of (C) there was produced 1,3-diphenyl-1-ethylcyclohexane which was characterized by elemental analysis and infrared and nuclear magnetic resonance spectra.

The infrared spectra of the synthetic 1,3-diphenyl-1-ethylcyclohexane and the hydrocarbon parent of the product of Example 1 were identical. The nuclear magnetic resonance spectra were identical except for a peak at 78 cps. (the alkane hydrogen region) in the synthetic compound which is attributable to an impurity in the sample. Mixtures of the two materials when analyzed on two different gas chromatographic column types showed only a single main peak.

The products of this invention, the bisphenols of vinyl cyclohexene, are suitable for use as intermediates in production of polymers.

For example, polycarbonate resins having extremely high use temperature characteristics and useful for insulating tapes, wire coating and similar applications can be prepared with the products of this invention. To demonstrate the following example is presented.

*Example 2*

To a two-liter glass reactor equipped with a sealed stirrer, a pH electrode, thermometer, gas inlet tube, dropping funnel and reflux condenser were charged:

| | Gm. |
|---|---|
| Bisphenol of vinyl cyclohexene | [1]163 |
| Sodium hydrosulfite | 0.11 |
| p-Phenylphenol | [2]5.0 |
| Sodium hydroxide solution: 20.3 gms. NaOH, 210 gms. $H_2O$ | 230.3 |
| Methylene chloride | 718 |
| Triethylamine | 1.67 |

[1] 0.55 m.
[2] 0.029 m.

With agitation, phosgene was bubbled into the reaction and simultaneously, a solution of 36.9 gms. of NaOH in 389 gms. of water was added dropwise to maintain the pH of the reaction within the range of 10.5–11.5. After the addition of the sodium hydroxide, solution was complete. The phosgene addition was continued until the pH of the reaction mass had dropped to 7.0. Throughout the entire phosgenation period, the temperature was maintained at 25±3° C. A total of 69 gm. of phosgene was used.

To the reaction mass was then added a solution of 25 gm. NaOH in 50 gm. $H_2O$. The reaction was stirred for 10 minutes, stirring was then stopped and the aqueous layer which developed was drawn off. The polymer solution was then stirred with 800 ml. distilled water and again the aqueous layer was decanted. This was repeated four times. The polymer solution was then agitated for two hours at room temperature with 230 ml. of aqueous hydrochloric acid (4.3% HCl). The acid water layer was then decanted and the polymer solution washed as before with 800 ml. portions of water until the decanted water layer was chloride free. The polymer solution was further diluted with 1600 ml. of $CH_2Cl_2$, filtered, and coagulated in 3000 ml. isopropanol (vigorously agitated). The precipitated polymer was recovered by filtration and dried 72 hours at 100° C. in an air circulating oven. The final polymer had a reduced viscosity at 25° C. in methylene chloride (0.2 gm. per 100 ml. solution) of 0.58. It was completely soluble in solvents such as $CH_2Cl_2$, dioxane, tetrahydrofuran and chloroform. The polymer had a melt flow of 0.15 decigram per minute at 280° C. and was thermally stable at 300° C.

Other applications for these compounds include use as hardeners for epoxy resins, use as bacteriacides, fungicides, miticides, as hormone agents, and as antioxidants.

*Example 3*

To a round bottom, 3-necked flask fitted with stirrer, thermometer, reflux condenser and a dropping funnel is added 250 grams (about 1 acid equivalent) of a sulfonated styrene, 4% divinyl benzene copolymer cation exchanging resin prepared as described above by replacing with o-cresol substantially all the water therefrom, i.e., to less than 2%.

The catalyst and o-cresol mixture is heated to 70–75° C. and 108 grams (1 mole) of vinyl cyclohexene is added dropwise over a 30 minute period. Cooling during this period maintains the temperature of the reactants between 70 and 75° C. After the addition and when the exotherm subsides, heat is applied for an additional 5 hours to maintain a temperature between 70 and 75° C.

After this period the warm reaction mixture is filtered and the catalyst washed 250 grams of molten o-cresol. The combined filtrate and washings are distilled at a reduced pressure to a final residue temperature of 200° C. at about 1 mm. Hg pressure. The residue comprises the bis cresol of 4-vinyl cyclohexene, 1,3-bis(m-methyl-p-hydroxyphenyl)-1-ethylcyclohexane.

*Example 4*

The apparatus and the procedure of Example 3 are used but o-chlorophenol is substituted for the o-cresol. The residue comprises the bis chlorophenol of 4 vinyl cyclohexene, 1,3-bis(m-chloro-p-hydroxyphenyl)-1-ethylcyclohexane.

Other hydroxyaryl compounds can be reacted with 4-vinyl cyclohexene to produce the corresponding bis compounds. For example, polynuclear substituted and unsubstituted hydroxyaryl compounds, e.g., the naphthols especially α- and β- naphthols are readily reacted with vinyl cyclohexene using the cation exchanging resin catalysts of the present invention to produce.

The preparation is illustrated by the following example:

*Example 5*

In a two liter flask equipped with a stirrer, thermometer, dropping funnel and reflux condenser is placed 900 grams of α-naphthol. The temperature is raised to 100° C. and with stirring there is added 200 grams of oven dried (105–110° C.) Dowex 50 X–4 cation exchanging resin in the acid (H+) form.

Stirring is continued and 54 grams of 4-vinyl cyclohexene is added dropwise over a 1 hour period at 100–

105° C. Heating and stirring are continued for 4 hours after addition is completed.

The reaction mixture is filtered and the cation exchanging resin washed with 200 grams α-naphthol. The filtrate and washings are combined and distilled at less than 0.5 mm. Hg to a final residue temperature of 200° C.

The residue is the bis naphthol of 4-vinyl cyclohexene.

What is claimed is:

1. Method for preparing a bisphenol of 4-vinylcyclohexene which comprises contacting together 4-vinylcyclohexene and at least a stoichiometric amount of a phenol having a replaceable hydrogen in a position other than meta to the phenolic hydroxyl at temperatures between about 30° and 150° C. with an alkylation catalyst consisting essentially of a substantially anhydrous insoluble acidic cation exchanging resin for a time sufficient to effect reaction between the 4-vinylcyclohexene and the phenol to produce a 1,3-bis(hydroxyaryl)-1-ethylcyclohexane.

2. Method for preparing a bisphenol of 4-vinylcyclohexene which comprises contacting together 4-vinylcyclohexene and from 3 to 20 moles of a phenol having a replaceable hydrogen in a position other than meta to the phenolic hydroxyl per mole of 4-vinylcyclohexene at temperatures of from 60 to 125° C. with an alkylation catalyst consisting essentially of an anhydrous insoluble acidic cation exchanging resin for a time sufficient to effect reaction between the 4-vinylcyclohexene and the phenol to produce a 1,3-bis(hydroxyaryl)-1-ethylcyclohexane.

3. Method for preparing a bisphenol of 4-vinylcyclohexene which comprises contacting together 4-vinylcyclohexene and from 6 to 12 moles of a phenol having a replaceable hydrogen in a position other than meta to the phenolic hydroxyl per mole of 4-vinyl cyclohexene at temperatures from 70–100° C. with an alkylation catalyst consisting essentially of an anhydrous insoluble acidic cation exchanging resin for a time sufficient to effect reaction between the 4-vinylcyclohexene and the phenol to produce a 1,3-bis(hydroxyaryl)-1-ethylcyclohexane.

4. The method claimed in claim 3 wherein the phenol is $C_6H_5OH$.

5. The method claimed in claim 3 wherein the phenol is naphthol, $C_{10}H_7OH$.

6. The method claimed in claim 3 wherein the phenol is chlorophenol, $ClC_6H_4OH$.

7. The bisphenol of 4-vinylcyclohexene having the formula

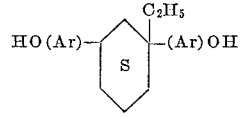

wherein Ar represents an aromatic moiety.

8. 1,3-bis(p-hydroxyphenyl)-1-ethylcyclohexane.

9. 1,3 - bis(m-methyl-p-hydroxyphenyl)-1-ethylcyclohexane.

10. 1,3 - bis (m-chloro-p-hydroxyphenyl)-1-ethylcyclohexane.

11. 1,3-bis(hydroxynaphthyl)-1-ethylcyclohexane.

References Cited by the Examiner

UNITED STATES PATENTS

| | | | |
|---|---|---|---|
| 2,596,235 | 5/1952 | Geiger | 260—619 |
| 2,623,912 | 12/1952 | Smith. | |
| 2,811,564 | 10/1957 | Bader | 260—619 |
| 3,049,568 | 8/1962 | Apel et al. | 260—619 |

OTHER REFERENCES

"Amberlite Ion Exchange", page 10, pub. by Rohm & Haas, The Resinous Products Division, Philadelphia, Pa. (1953).

Sussman, Industrial & Eng Chem. 38:1228–30 (1946) (TPI. A58).

LEON ZITVER, *Primary Examiner.*

HAROLD G. MOORE, *Examiner.*